United States Patent [19]

Vess

[11] Patent Number: 4,725,632

[45] Date of Patent: Feb. 16, 1988

[54] CEMENTITIOUS COMPOSITION

[75] Inventor: Samuel P. Vess, Cedar Hill, Tex.

[73] Assignee: VESS-TECH Industries, Inc., Fort Worth, Tex.

[21] Appl. No.: 810,575

[22] Filed: Dec. 12, 1985

[51] Int. Cl.$^4$ .................. C08K 3/34; C04B 21/08; C04B 25/04; C04B 15/02

[52] U.S. Cl. .................. 523/220; 523/218; 524/5; 524/512

[58] Field of Search .............. 524/5, 512; 523/218, 523/220

[56] References Cited

U.S. PATENT DOCUMENTS

| | | | |
|---|---|---|---|
| 3,565,648 | 2/1971 | Mori et al. | 106/89 |
| 3,591,395 | 7/1971 | Zonsveld et al. | 106/99 |
| 3,711,431 | 1/1973 | Vargiu et al. | 521/82 |
| 3,870,553 | 3/1975 | Hussey | 106/90 |
| 4,038,444 | 7/1977 | Steinhauser et al. | 427/261 |
| 4,058,406 | 11/1977 | Raponi | 106/90 |
| 4,240,952 | 12/1980 | Hulbert et al. | 106/97 |
| 4,293,343 | 10/1981 | Shannon | 106/99 |
| 4,331,726 | 5/1982 | Cleary | 428/143 |
| 4,371,639 | 2/1983 | Muszynski | 523/512 |
| 4,375,489 | 3/1981 | Muszynski | 428/36 |
| 4,382,820 | 5/1983 | Inoue | 106/90 |
| 4,504,320 | 3/1985 | Rizer et al. | 106/98 |
| 4,558,781 | 12/1985 | Murphy | 206/219 |

OTHER PUBLICATIONS

Derwent Abstract 02685 E/02, Matsushita Elect. Works J56149361 (11-1981).
Derwent Abstract 84-246030/40, Hoechst Gosei KK J59146960-A (8-1984).

*Primary Examiner*—Herbert J. Lilling
*Attorney, Agent, or Firm*—Charles D. Gunter; James E. Bradley

[57] ABSTRACT

Curable cementitious compositions are shown which are capable of being cured to form an article of construction. The compositions include a liquid vehicle made up of a latex emulsion extender, a water soluble polymeric plasticizer, and water. Fly ash and Portland cement are added to the liquid vehicle to form the cementitious compositions.

6 Claims, 2 Drawing Figures

CEMENTITIOUS COMPOSITION

BACKGROUND OF THE INVENTION

1. Field of the Invention

This invention relates to cementitious compositions which can be cured to form articles of construction.

2. Description of the Prior Art

Light-weight cementitious compositions are known in which the desired weight reduction over concrete is achieved by the use of light-weight aggregate. Examples of such materials can be found, for example, in U.S. Pat. No. 3,782,985. However, articles made from such materials usually possess tensile strengths which are too low for many applications.

The use of polymeric materials in concrete formulations is also known. One such material is known as polymer-impregnated concrete (PIC) and is comprised of hardened Portland cement concrete impregnated with a liquid monomeric material which is subsequently polymerized in situ. Such materials are durable and make attractive pipe, tunnel supports, bridge decks, and the like. Another system is a polymer-Portland cement concrete (PPCC) in which a monomeric or polymeric material is added to a fresh Portland cement concrete mixture, with the mixture then being cured and polymerized after placement. One another system is the polymer concrete (PC) system which contains little or no cement and no water. This system is formed by polymerizing a monomeric material with aggregate (sand, gravel, etc).

The present invention has as its object the provision of a light weight cementitious composition which has the desirable tensile and compressive strength of more traditional concretes for use as a structural building material.

Another object of the invention is the provision of such a material which is characterized by the substantial absence of aggregate such as sand and gravel, which has a high insulation value, which resists flame, which can be formed from commercially available materials, and which can be cast into a variety of structural shapes and forms.

SUMMARY OF THE INVENTION

The cementitious compositions of the invention are formed from a liquid vehicle which comprises a latex emulsion extender, a water soluble polymeric plasticizer and water. An accelerator can also be added to the vehicle to decrease the curing time of the cementitious composition. The cementitious compositions are formed by the addition of Portland cement and fly ash to the liquid vehicle. Synthetic fibers and beads, as well as steel fibers, can be added to the cementitious compositions depending upon the end use of the cured compositions.

A curable cementitious composition of the invention is characterized by the substantial absence of sand and gravel aggregate, by a density of less than about 75 lbs/cu.ft., a compressive strength of as high as 30,000 psi, zero flame spread characteristics and a total thermal resistance in the range of 4.33 Hr-ft 2-F 0/BTU.

In addition to standard building panels and roof panels cast from the cementitious compositions of the invention, high strength panels can be formed by first providing a frame in the desired panel shape, the frame having a bottom and sidewalls extending upwardly therefrom. Dry steel fibers are first poured into the frame to form a bottom layer of dry fibers. An impact layer of a curable cementitious composition is then added to the frame on top of the bottom layer of dry fibers while vibrating the frame. The impact layer is allowed to partially cure and a cushioning layer of a curable cementitious composition is added to the frame on top of the impact layer. The cementitious compositions are allowed to cure and the cured panel is removed from the frame.

Stress and impact barrier coats of the curable cementitious compositions of the invention can be used to coat a variety of structural articles including wood and insulation substrates.

The above as well as additional objects, features, and advantages of the invention will become apparent in the following detailed description.

DESCRIPTION OF THE PREFERRED EMBODIMENT

Figure 1:
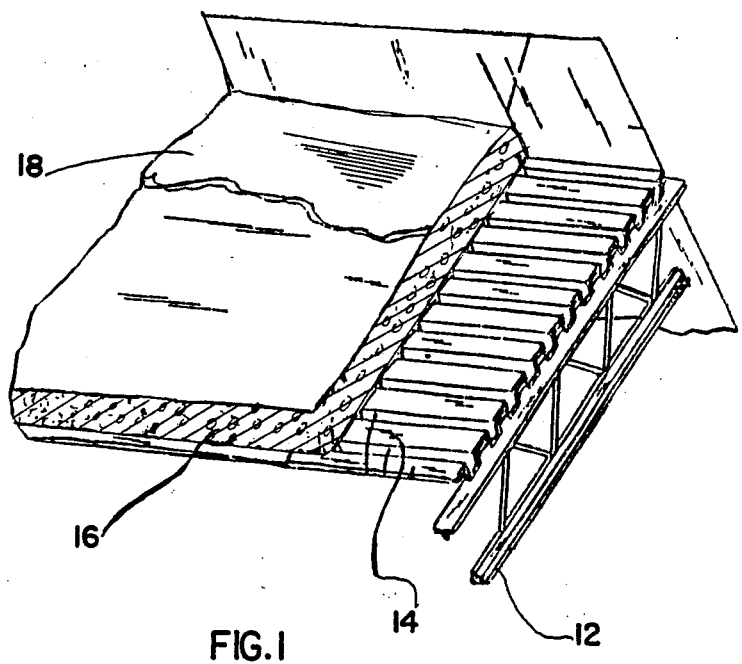
FIG. 1 is a partial perspective view of a built-up roof panel utilizing a cementitious composition of the invention.

The cementitious compositions of the invention are formulated using a unique liquid vehicle which, when combined with Portland cement and fly ash, forms a curable composition which can be cast into a variety of shapes. The liquid vehicle comprises a latex emulsion extender, a polymeric plasticizer and water, to which can be added an accelerator to decrease the curing time of the cementitious composition.

The latex emulsion extenders useful for the present invention are water based or water extended and set by polymerization and cross-linking under atmospheric conditions. Such compounds are sold commercially under such trade names as "Rhoplex" Acrylic Emulsion supplied by Rohm and Hass Company of Philadelphia, Pa., and "Elvace" acetate/ethylene copolymer emulsion furnished by DuPont Company of Wilmington, Del. These emulsions are latex based, of relatively high solids content (40–60%) of monomers such as styrenes, acrylic nitrites (particularly methyl acrylate), vinyl acetates, vinyl chlorides, and similar lattices.

The preferred latex emulsion extender is an acrylic latex emulsion extender sold by Union Carbide Corporation of Danbury, Conn., as "UCAR Vehicle ICX-7174." This product is an acrylic emulsion polymer having a solids percent by weight of 47%, a pH of 9.0–10.0, a viscosity of 50 cps, and a weight per gallon of 8.8 pounds.

The vehicle also includes a plasticizer, sometimes referred to as a "superplasticizer" to those skilled in the art. Such materials are used to reduce mixing water and produce high strength, low water/cement ratio compositions. The preferred plasticizer is sold commercially by American Admixtures and Chemicals Corporation of Chicago, Ill., as "Melament Type A Super Plasticizer" and is a melamine formaldehyde-based water soluble polymer which is chloride free.

The latex emulsion extender and plasticizer are used in an approximate weight ratio of 2.5:1.0 in the liquid vehicle of the invention. The amount of water utilized in the liquid vehicle is varied depending upon the end use of the cementitious composition. For instance, to form a high stress skin barrier coat composition of the invention, for every 100 pounds of water used in the liquid vehicle, 25 pounds of latex emulsion extender are used and 10 pounds of plasticizer are used. To form a 45 pound density structural panel, the same percentages by weight of extender and plasticizer are used for every 200 pounds of water used in the liquid vehicle. To form a 25 pound density structural panel, the same percentages by weight of extender and plasticizer are used for every 300 pounds of water used in the liquid vehicle. Specifiec examples of these structural articles made with the cementitious compositions of the invention follow.

In addition to water, the liquid vehicle can conveniently have added thereto an accelerator for decreasing the curing time of the cementitious composition. Various accelerators are known to those skilled in the art for the present purpose. However, chloride free accelerators are preferred to avoid a corrosive effect in the end application. The most preferred accelerator is sold commercially American Admixtures and Chemicals Corporation of Chicago, Ill., as "Lubricon NCA" and is a non-corrosive, water reducing, set accelerating admixture designed to accelerate the rate of hardening of cement or concrete, especially in cold weather.

The accelerator is preferably present in a weight range of about 0.1 to 3.0% by weight, most preferably about 1.0 to 1.5 & by weight per hundred weight of Portland cement and fly ash (dry ingredients).

To form the cementitious compositions of the invention, Portland cement and fly ash are added to the liquid vehicle. While it appears that any of the various grades of Portland cement which are commercially available are suitable for use in the compositions of the invention, Type I Portland cement is preferred. This cement meets the requirements of ASTM C-150-84 and has a density of 94 lbs/cu.ft.

Fly ash is derived as a by product of the firing of coal. Because of the differences in coal sources and firing equipment and techniques, the physical properties, chemical compositions and pozzolanic activity of the fly ashes will also vary. U.S. Pat. No. 4,210,457, for instance, details typical chemical analyses of fly ashes from eleven different sources. The preferred fly ash for use in the compositions of the invention is "Class C" fly ash as defined by ASTM C618 and has a density of 80 lbs/cu.ft.

Depending upon the end application, the cementitious compositions of the invention will contain varying amounts of reinforcing or extending materials such as synthetic fibers, synthetic beads, metal fibers and the like. The preferred reinforcing materials include synthetic polyolefins such as the polypropylene fibers sold as "Forta Fibre" by Forta Fibre Corporation of Grove City, Pa. These polypropylene fibers are processed into a fibrilated bundle which opens when placed into the cementitious composition. As mixing proceeds, the friction within the mix, coupled with the action of the mixing device, shears the bundle yielding a homogeneously distributed monofilament polypropylene fiber. These fibers have a specific gravity of 0.91, a density of 56 lbs/cu.ft., a modulus of elasticity of $0.70 \times 10^6$ psi, and a tensile strength of 70,000 psi. The preferred fiber length varies from about $\frac{1}{4}$" to $1\frac{1}{2}$".

The synthetic beads used in the compositions of the invention are preferably polystyrene beads which are the regrind of 1 lb./cu. ft. density polystyrene and have an average bead size of approximately 2 mm. The metal fibers are preferably steel fibers sold by Baekaert Steel Corporation as "ZL-30/50."

The following examples are illustrative of the cementitious compositions of the invention:

EXAMPLE ONE

45 pound density panel

| Liquid Vehicle Component | Pounds | Gallons |
|---|---|---|
| Water | 200 | 36 |
| Latex Extender | 25 | 2.55 |
| Plasticizer | 10 | 1.0 |
| Accelerator | 1 | 0.02 |
| Totals | 236 | 27.57 |

The following dry ingredients are then added to 269 pounds of liquid vehicle formulated as shown above:

| | | |
|---|---|---|
| Fly Ash | 471 | pounds dry |
| Portland Cement Type I | 471 | pounds dry |
| EPS Beads, 2 mm. | 20 | cu. ft. |
| Polypropylenen Fiber | 1.6 | pounds |
| Total Weight Dry Ingredients | 963.6 | pounds |

The total weight wet of the above cementitious composition is 1232.6 pounds and produces 27 cu.ft. or one cu. yd. of composition. The composition can be cast into panels which are characterized by the substantial absence of sand or gravel aggregate, a density of 45 lbs./cu.ft., zero flame spread characteristics (per ASTM E-84), and a total thermal resistance in the range of 4.33 Hr-ft $^2$-F $^0$/BTU (per ASTM C-177). The panels can be used as exterior, interior ceiling/roof or load bearing structural panels. In ceiling/roof installations, the cementitious material can be cast within roof trusses so that the trusses extend from within the cementitious material.

EXAMPLE TWO

25 pound density panel

To form a 25 pound density panel, the above process was repeated, except that the liquid vehicle was formulated as follows:

| Liquid Vehicle Component | Pounds | Gallons |
|---|---|---|
| Water | 300 | 36 |
| Latex Extender | 25 | 2.55 |
| Plasticizer | 10 | 1.0 |
| Accelerator | 1.5 | 0.023 |

The above cementitious composition was cast to form a built-up roof panel, as shown in FIG. 1. A typical installation includes roof trusses 12 which carry corrugated steel panels 14. Onto the corrugated steel panels 14 is placed the 24 pound density panel of the cementitious material of the invention 16. A top coating 18 of roofing tar can be applied on top of the cementitious material 16. In the arrangement described, the cementitious material 16 replaces the standard insulation and eliminates the need for a layer of mineral board over the cementious layer 16.

EXAMPLE THREE

High Stress Panels

| Liquid Vehicle Component | Pounds | Gallons |
|---|---|---|
| Water | 100 | 12.0 |
| Latex Extender | 25 | 2.55 |
| Plasticizer | 10 | 1.0 |
| Accelerator | 1 | 0.02 |
| Totals | 136 | 15.57 |

A high stress impact barrier coat was then formulated with the liquid vehicle as follows:

| | |
|---|---|
| Fly Ash | 20 pounds dry |
| Portland Cement Type I | 20 pounds dry |
| Baekaert Steel Fiber | 6 pounds dry |
| Liquid Vehicle | 12 pounds |

A cushioning coat was formulated with the same liquid vehicle as follows:

| | |
|---|---|
| Fly Ash | 30 pounds dry |
| Portland Cement Type I | 30 pounds dry |
| Polypropylene Fiber | 70 grams |
| EPS Beads (3 cu. ft.) | 1.5 pounds dry |
| Liquid Vehicle | 26 pounds |

Figure 2:
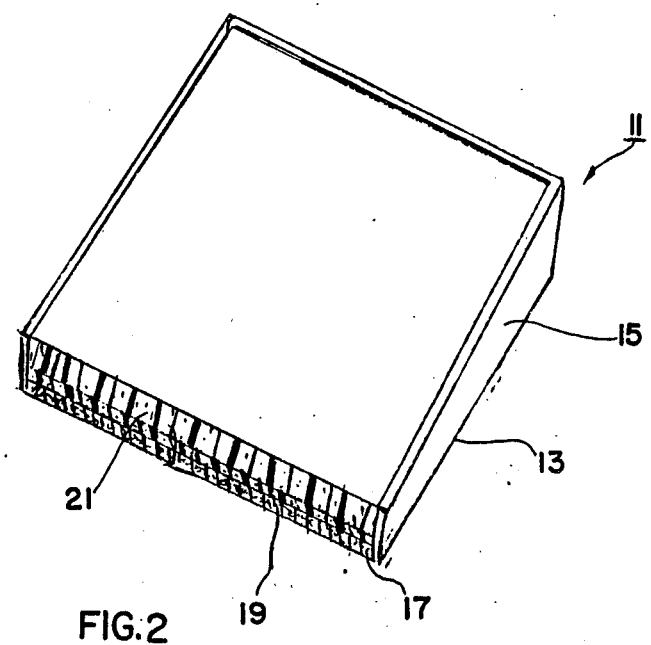
FIG. 2 is a perspective view, partially in section, showing the formation of a high strength panel made with cementitious compositions of the invention.

The compositions of Example Three were used to form a high strength panel as follows: A frame is provided in the desired panel shape. A frame is shown in FIG. 2 as 11, having a bottom 13 and sidewalls 15 extending upwardly therefrom. The Baekaert Steel Fibers ZL-30/50 are first poured into the frame to form a bottom layer of dry steel fibers 17 with approximately ¾ pound of fibers being used per square foot of frame surface. Approximately ½ inch of high stress impact barrier composition 19 was then added to the frame on top of the bottom layer of dry fibers while vibrating the frame. After the impact barrier composition has partially set, approximately 2½ inches of cushioning composition 21 was then added to the frame on top of the impact barrier composition. The barrier and cushioning compositions were then allowed to cure to form a composite panel, and the cured panel was removed from the frame.

The high strength panel can be provided with a compressive strength in the range of 30,000 psi and has proved suitable for use as an ice shield for roof panels for the communication industry. The panels are also resistant to explosion and small arms fire and have been tested up to the caliber of 44 magnum without allowing penetration.

The impact barrier coats used in forming the high strength panels can be used alone as barrier coats for a variety of substrates, such as wood, polyurethane, isocyanates, etc. Typically, a ⅜ inch coat of the barrier coat is sprayed, troweled or painted onto the substrate.

An invention has been provided with several advantages. The cementitious compositions of the invention are of lighter weight than traditional concrete making them easier to handle during installation of precast panels. The compositions have a high insulation value not found in aggregate concrete and are flame resistant. The materials for casting the compositions of the invention are easily available. The cured compositions are inert and do not expand or contract as in conventional concrete. The density of the cast panels can be varied, depending upon the intended application, by merely varying the amount of mixing water used in the liquid vehicle. By the addition of appropriate reinforcing materials, high strength panels with extremely high impact resistance, and compressive and tensile strengths can be provided.

While the invention has been described in only three of its forms, it should be apparent to those skilled in the art that it is not so limited, but is susceptible to various changes and modifications without departing from the spirit thereof.

I claim:

1. A curable cementitious composition which is curable under atmospheric conditions and which is characterized by the substantial absence of sand and gravel aggregate, having a density of less than about 75 lbs/cu. ft., a compressive strength of as high as 30,000 psi, zero flame spread characteristics and a total thermal resistance in the range of 4.33 Hr-ft$^2$-F$^0$/Btu, capable of being cured to form an article of construction, said composition comprising:

a liquid vehicle including about 25 parts by weight of a latex acrylic emulsion extender, about 10 parts by weight of a water soluble melamine formaldehyde-based polymeric plasticizer, and about 100–300 parts by weight water, the weight ratio of extender to plasticizer in the liquid vehicle being about 2.5:1; and the liquid vehicle being combined with dry ingredients including fly ash, Portland cement, polypropylene fiber and polystyrene beads to form the curable cementitious composition, the weight ratio of the liquid vehicle to the dry ingredients being in the range from about 1:2.9 to 1:5.

2. The curable cementitious composition of claim 1, further comprising:

an accelerator for decreasing the curing time of the cementitious composition.

3. A curable cementitious composition which is curable under atmospheric conditions and which is characterized by the substantial absence of sand and gravel aggregate, having a density of less than about 75 lbs/cu. ft., a compressive strength of as high as 30,000 psi, zero flame spread characteristics and a total thermal resistance in the range of 4.33 Hr-ft$^2$-F$^0$/Btu, capable of being cured to form an article of construction, said composition comprising:

a liquid vehicle including about 25 parts by weight of a latex acrylic emulsion extender which is an acrylic emulsion polymer having a solids percent by weight of 47%, a pH of 9.0–10.0, a viscosity of 50 cps, and a weight per gallon of 8.8 pounds, about 10 parts by weight of a water soluble melamine formaldehyde-based polymeric plasticizer, and about 100–300 parts by weight water, the weight ratio of extender to plasticizer in the liquid vehicle being about 2.5:1;

the liquid vehicle being combined with dry ingredients including fly ash, Portland cement, polypropylene fiber and polystyrene beads to form the curable cementitious composition, the weight ratio of the liquid vehicle to the dry ingredients being in the range from about 1:2.9 to 1:5; and wherein the polypropylene fiber is provided as a fibrillated bundle which opens when placed into the cementitious composition, the fiber having a specific gravity of about 0.91, a density of about 56 lbs/cu.ft., a modulus of elasticity of about $0.70 \times 10^6$ psi, and a tensile strength of 70,000 psi.

4. The curable cementitious composition of claim 3, wherein the polypropylene fibers within said curable cementitious composition have a fiber length in the range from about ¾" to 1½".

5. The curable cementitious composition of claim 4, wherein the polystyrene beads dispersed within said curable cementitious composition are a regrind of 1 lb./cu.ft. density polystyrene and have an average bead size of approximately 2 mm.

6. The curable cementitious composition of claim 3, further comprising a plurality of steel fibers dispersed within said curable cementitious composition.

* * * * *